(12) United States Patent
Melzer

(10) Patent No.: US 9,049,469 B2
(45) Date of Patent: Jun. 2, 2015

(54) ENCRYPTION AND DECRYPTION OF VISIBLE CODES FOR REAL TIME AUGMENTED REALITY VIEWS

(71) Applicant: Roy S. Melzer, Tel-Aviv (IL)

(72) Inventor: Roy S. Melzer, Tel-Aviv (IL)

( * ) Notice: Subject to any disclaimer, the term of this patent is extended or adjusted under 35 U.S.C. 154(b) by 0 days.

(21) Appl. No.: 14/243,921

(22) Filed: Apr. 3, 2014

(65) Prior Publication Data

US 2014/0299660 A1    Oct. 9, 2014

Related U.S. Application Data

(60) Provisional application No. 61/807,818, filed on Apr. 3, 2013.

(51) Int. Cl.
*G06F 17/00* (2006.01)
*H04N 21/40* (2011.01)
*H04N 21/44* (2011.01)
*H04N 21/858* (2011.01)

(52) U.S. Cl.
CPC ......... *H04N 21/40* (2013.01); *H04N 21/44008* (2013.01); *H04N 21/858* (2013.01)

(58) Field of Classification Search
USPC ................ 235/375; 345/8, 165, 633; 359/630
See application file for complete search history.

(56) References Cited

U.S. PATENT DOCUMENTS

| | | | | |
|---|---|---|---|---|
| 8,879,155 | B1 * | 11/2014 | Teller | 359/630 |
| 2013/0278631 | A1 * | 10/2013 | Border et al. | 345/633 |
| 2014/0337634 | A1 * | 11/2014 | Starner et al. | 713/186 |

* cited by examiner

*Primary Examiner* — Ahshik Kim

(57) ABSTRACT

A method of decrypting an encrypted message. The method comprises storing a wearer decryption code in a memory of a wearable mobile device having a head-worn augmented display which generates an augmented reality view for a wearer of the wearable mobile device, capturing using the wearable mobile device a video sequence including at least one frame imaging a visible code using an image sensor of the wearable mobile device, processing the video sequence to identify the visible code, decrypting the visible code using the wearer decryption code to create an decrypted content, and presenting the decrypted content on top of at least some of the visible code in the augmented reality view.

19 Claims, 7 Drawing Sheets

ENCRYPTION AND DECRYPTION OF VISIBLE CODES FOR REAL TIME AUGMENTED REALITY VIEWS

RELATED APPLICATION

This application claims the benefit of priority under 35 USC 119(e) of U.S. Provisional Patent Application No. 61/807,818 filed Apr. 3, 2013, the contents of which are incorporated herein by reference in their entirety.

BACKGROUND

The present invention, in some embodiments thereof, relates to wearable systems and methods of using thereof and, more specifically, but not exclusively, to systems and methods for image enhancement and data privacy in wearable devices.

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image may be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view. The HMD may be used to provide an augmented reality experience.

SUMMARY

According to some embodiments of the present invention, there is provided a method of decrypting an encrypted visible code. The method comprises storing a wearer decryption code in a memory of a wearable mobile device having a head-worn augmented display presenting an augmented reality view for a wearer of the wearable mobile device, capturing using the wearable mobile device a video sequence including at least one frame imaging a visible code using an image sensor of the wearable mobile device, processing the video sequence to identify the visible code, decrypting the visible code using the wearer decryption code to create an decrypted content, and presenting the decrypted content on top of at least some of the visible code in the augmented reality view.

Optionally, the visible code is presented on a screen of a client terminal.

More optionally, the wearer decryption code is forwarded to the head-worn augmented display via a first network connection and the visible code is forwarded to the client terminal via a second network connection; wherein the first and second network connections are different network connections.

More optionally, the client terminal is a cellular device which is connected to the wearable mobile device and used for establishing the first and second network connections.

Optionally, the presenting comprises tracking the location of the visible code and relocating the decrypted content to remain on top of at least some of the visible code in the augmented reality view.

Optionally, the visible code comprises a barcode.

Optionally, the visible code includes a cipher text and the wearer decryption code is a key that determines a transformation of the cipher text.

Optionally, the visible code includes a plain text and the wearer decryption code is a key that determines a transformation of the plain text.

Optionally, the method further comprises identifying a location of the head-worn augmented display and performing the decrypting using the wearer decryption code according to the location.

More optionally, the visible code is a text of a member of a group consisting of a traffic sign, a billboard, and a shop board.

More optionally, the wearer decryption code is associated with a transaction benefit and the visible code comprises a text indicative of a price of a product.

More optionally, the visible code comprises a text indicative of a health notice pertaining to a product offered for sale.

Optionally, the method further comprises receiving a wirelessly transmitted message which contains the wearer decryption code.

Optionally, the method further comprises the processing is triggered by the wirelessly transmitted message.

Optionally, the method further comprises transmitting a message indicative of an identity of the wearer and wirelessly receiving the wearer decryption code in response to the message.

Optionally, the wearer decryption code is generated according to an International Mobile Station Equipment Identity (IMEI) of a cellular device that is paired with the wearable mobile device via.

According to some embodiments of the present invention, there is provided a head-mounted display apparatus. The head-mounted display apparatus comprises an image display device which generates an augmented reality view for an observer, a wearing device with which the image display device is worn on a head of the observer, a memory which stores a wearer decryption code, an image sensor which captures a video sequence including at least one frame imaging a visible code, a processor, an image processing module which processes the video sequence to identify the visible code, and a decrypting module which decrypts the visible code using the wearer decryption code to create an decrypted content. The augmented reality view presents the decrypted content on top of at least some of the visible code.

According to some embodiments of the present invention, there is provided a method of decrypting an encrypted visible code. The method comprises forwarding, via a second network, a visible code to be presented on a screen of a client terminal, forwarding, via a first network, a wearer decryption code to a wearable mobile device having a head-worn augmented display presenting an augmented reality view which includes the screen for a wearer of the wearable mobile device, capturing a video sequence including at least one frame imaging the visible code when presented on the screen, processing the video sequence to identify the visible code, decrypting the visible code using the wearer decryption code to create an decrypted content, and presenting the decrypted content on top of at least some of the visible code in the augmented reality view.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A and 6B are, respectively, schematic illustrations of a visible code printed on a box of a food product in a manner that is visible to a wearer of the wearable computing device and a the wearer's field of view that includes the decrypted content, an heath notice, presented as an overlay on top of the visible code, according to some embodiments of the present invention.

DETAILED DESCRIPTION

Figure 1:
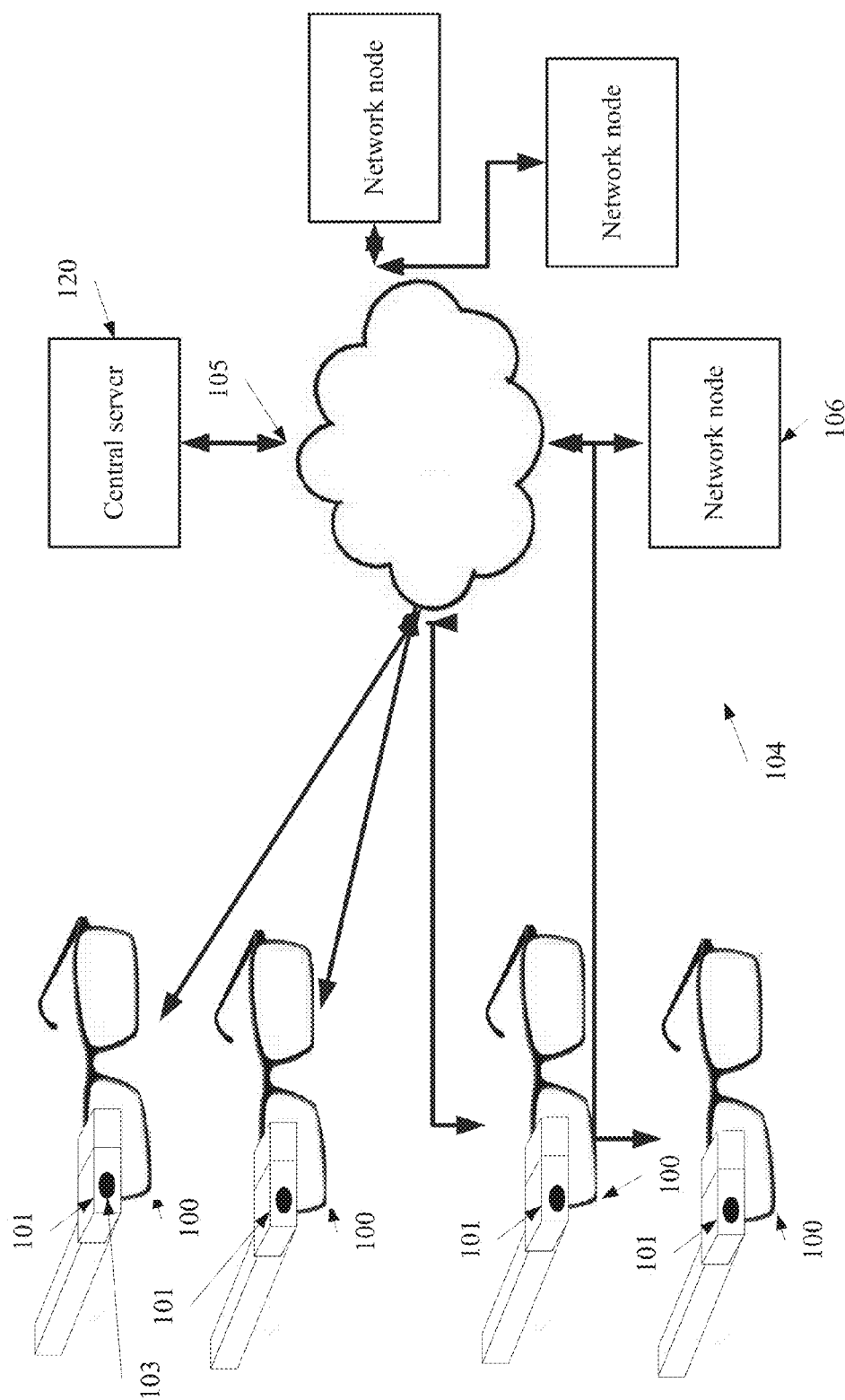
FIG. 1 is schematic illustration of a wearable computing device having a head-worn augmented display that generates an augmented reality view for an observer, according to some embodiments of the present invention.

The present invention, in some embodiments thereof, relates to wearable systems and methods of using thereof and, more specifically, but not exclusively, to systems and methods for image enhancement and data privacy in wearable computing devices.

According to some embodiments of the present invention there are provided methods and systems of enhancing an augmented display of a worn computing device with observer adapted data, for example personalized data, by using a wearer decryption code stored in the memory of the worn computing device to decrypt content from a visible code or from data associated therewith.

In use, the content decrypted according to the visible code is presented to the observer on top of at least some of the visible code. In such a manner, although the visible code is available to any human or camera which is in a line of sight therewith, only the observer who is presented with the augmented display can perceive the data which is encoded by the visible code.

Optionally, the visible code is decrypted based on real time location data that is gathered by the wearable computing device and/or a device paired thereto. Optionally, the visible code is decrypted based on data from a data signal which is captured by the wearable computing device and/or a device paired thereto.

Optionally, the visible code is presented on a screen of a client terminal, for example content that is available via a browser and/or an electronic message reader. In such embodiments, the wearer decryption code and the visible code may be forwarded to the client terminal and to the wearable computing device via separate networks and/or means. In such an embodiment, data which is presented by a tablet or a laptop can remain encrypted even when presented to the observer in a public location and/or via an unsecured network.

Optionally, the wearer decryption code is a code, for example a decryption key that is associated with a certain user, for example subscriber, for instance based on a unique number, telephone number, identifier and/or the like. Optionally, the visual code is a label, a barcode, an image, plain text, and/or cipher text.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
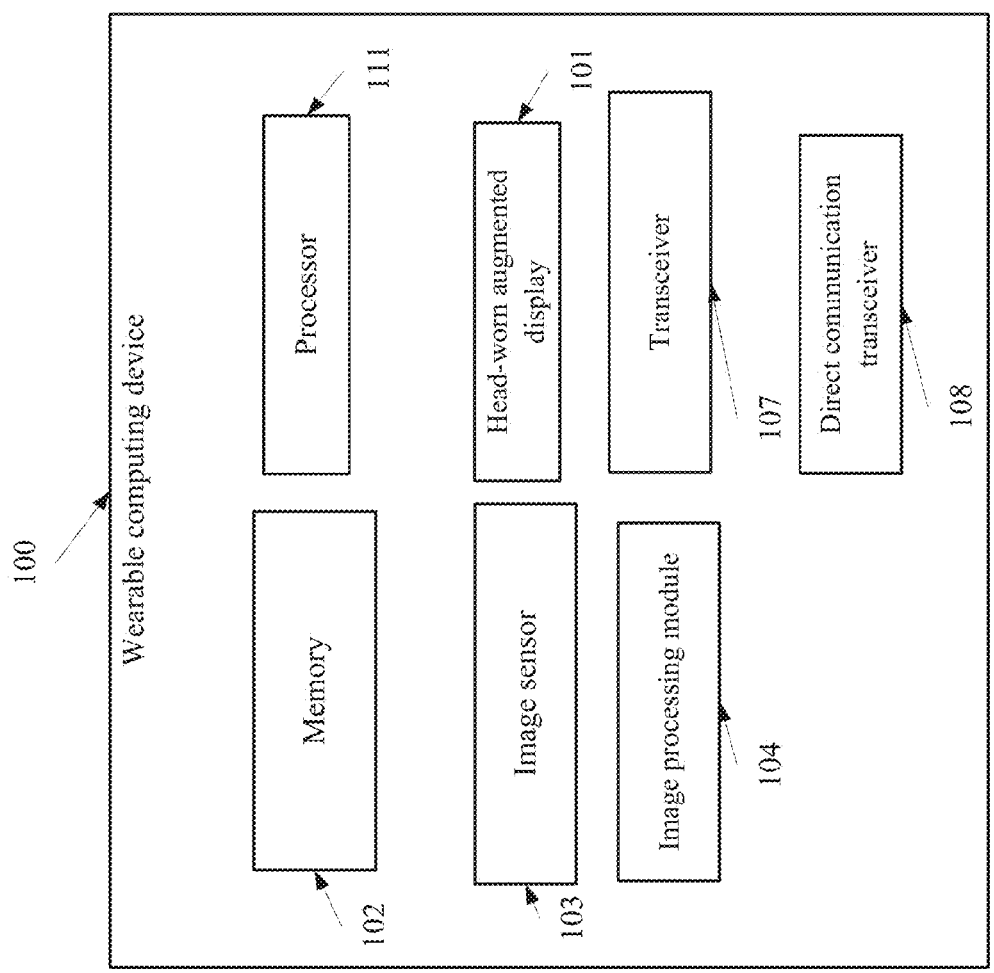
FIG. 2 is a functional block diagram of components of the wearable computing device, according to some embodiments of the present invention.

Reference is now made to FIG. 1 which is a schematic illustration of an exemplary wearable computing devices 100 each having a worn augmented display 101 that generates an augmented reality view for an observer, a wearer of the wearable mobile device 100, according to some embodiments of the present invention. The exemplary wearable computing devices 100 may be connected via a network 105 to a network node, such as server 140. Reference is also made to FIG. 2 which is a functional block diagram of components of the wearable computing device 100, according to some embodiments of the present invention.

As used herein, decryption means any convention of the visible code and/or data associated with the visible code using the wearer decryption code.

The augmented reality view includes an overlay or any other augmentation of private and/or personalized decrypted content generated using a wearer decryption code based on a visible code that may be viewed by the wearer of the wearable mobile device 100 at a naked eye glance. The visible code may be a cipher text, a plain text, a barcode, an encrypted image, an encrypted video and/or any visible content that may be decrypted by one or more keys. Optionally, the visible code is decrypted differently by different wearer decryption codes to create a plurality of different private and/or personalized decrypted content items. In such embodiments, the same visible code is decrypted to present different content to different observers, for example as described below. Optionally, the visible code includes a machine readable portion, for example a machine readable tag, code and/or the like and a data presentation area wherein decrypted content is about to be presented after the decryption. For example, the data presentation area may be an area at the top left of the field of view of the wearer and/or an area having a uniform texture. The decrypted content may be adapted, inter alia, to the age, the gender, the language knowledge, and/or any other characteristic of the observer.

The wearable computing device 100 includes a memory 102 which stores the wearer decryption code and an image sensor 103 which captures a video sequence including one or more frames imaging the visible code. The image sensor 103 is optionally mounted to capture some or all of the surrounding currently viewed by the wearer, namely the wearer point of view. The wearer decryption code may be referred to as a unique decryption code. The wearer decryption code may uniquely associate with a certain wearer.

The wearable computing device 100 includes an image processing module 104 that processes the video sequence to identify the visible code and a decrypting module 105 which decrypts the visible code using the wearer decryption code to create a decrypted content. This allows, as further described below, to display an augmented reality view that presents the decrypted content on top of at least some of the visible code. The wearer decryption code is optionally a code that is generated for the observer, for example associated with an identifier (ID) thereof, such as a telephone number, email, ID number and/or the like. The decryption code may be a set of a plurality of decryption codes which for brevity referred to herein as a decryption code. The decryption code may be updated by a central server 120, either predictably, randomly or upon request, for example as described below. For instance, the central server 120 forwards updates and/or new decryption codes to the wearable computing devices 100 via an SMS, a WAP message, a TCP/IP message and/or the like. The decryption code may be locally adapted by the wearable computing device 100, for example based on local unique data related to the wearer, for example based on a biometric signature of the wearer, such as an image of a fingerprint, a pupil or other biological trait. In such embodiments, the central server 120 encodes the message with the decryption code and the decryption code is decoded using the biometric signature. Namely, in such embodiments, the decryption code is locally prepared based on the biometric signature of the wearer, for example by instructing the wearer to take an image of the biological trait, instructing the wearable computing device 100 to take an image of the biological trait automatically, and/or the like. The decryption code is encoded by the central server using a similar image which is provided thereto in a secure.

The wearable computing device 100 optionally comprises a transceiver 107 that is able to communicate, optionally via an access point, with one or more network nodes 106, for example the central server 120 and/or other server(s) and/or database(s) via a communication network 105, for example the internet, and/or directly via a client terminal, such as a laptop, a Smartphone, a tablet, and/or the like. The client terminal may function as an access point. The transceiver 107 may be a cellular communication module a wireless local area network (WLAN) interface, for example a Wi-Fi™ module. Additionally or alternatively, the wearable computing device 100 optionally comprises a direct communication transceiver 108 that is able to communicate in with a device having proximate transmitter, for example a beacon and/or a wireless personal area network (WPAN) unit and/or an optical sensor which detects optical signals, and/or an audio sensor which detects audible signals, for example a microphone. The communication may be unidirectional or bidirectional.

The wearable computing device 100 may be connected to and/or includes a handheld communication device, such as a cellular device, for example a Smartphone and/or a tablet. In such embodiments, some of the components of the wearable computing device 100, for example a processor 111, the transceivers 108, 107 and/or the modules described below may be hosted by the handheld communication device.

The wearable computing device 100 may use the direct communication transceiver 108 and/or the transceiver 107 to receive a radio frequency signal, e.g., Wi-Fi™ encoded message, Bluetooth™ encoded message, a radio frequency identification (RFID) tag presence, near field communication (NFC) message, an optical signal, such as an optical signal emitted by a visible or infrared light emitting diode (LED) device, and/or an acoustic signal, such as an ultrasonic signal.

The worn augmented display 101 may be a head-mounted display (HMD) that presents the wearer with an augmented reality view, allowing her to observe a real-world surroundings and the decrypted content, for example a computer-generated image, text, graphics, movie and/or the like simultaneously. The decrypted content may be presented as an overlay on top of some or all of the visual code.

The worn augmented display 101 may include an optical system mounted to a head-mounted support. The optical system may be operable to present virtual images overlaid upon a real-world view to a wearer. To display a virtual image to the wearer, the optical system may include a light source, such as a light-emitting diode (LED) configured to illuminate a display panel, such as a liquid crystal-on-silicon (LCOS) display panel. The display panel generates light patterns by spatially modulating the light from the light source, and an image former forms a virtual image from the light pattern.

In use, the wearable computing device 100 detects and identifies one or more visible codes within the wearer's environment, for example by an analysis of one or more frames in the sequence captured by the image sensor 103 corresponding to the wearer's point-of-view. The detected visible code(s) is decrypted using the wearer decryption code to create a decrypted content that is presented on top at least some of the visible code.

The decrypted content may include one or more reference (s) to a network accessible content, for example video, audio, graphical, and/or textual content that is available via the Uniform Resource Locator (URL). In such embodiment, the decrypted content includes data acquired using the reference (s). The content may be acquired using the direct communication transceiver 108 and/or the transceiver 107.

Optionally, the decrypted content is a script or a reference to a script that loads an interactive man machine interface, for example a graphical user interface (GUI), for example includes combo boxes, navigation panes, menus, and/or other user interface features that enable a wearer to invoke functions of the wearable computing device 100 and/or to induce sending messages with instructions to a device associated with the visible code. In such embodiments the GUI is placed one top of at least some of the visible code.

Optionally, the wearable computing device 100 detects one or more signals, optionally during the capturing and analysis of the sequence, for example using the direct communication transceiver 108 and/or the transceiver 107. Optionally, in order to reduce power and computational consumption, the wearable computing device 100 triggers the processing of the sequence in response to the detection of the one or more signals. The signals may be a beacon signal and/or a signal received in response to presence signal sent from the direct communication transceiver 108 and/or the transceiver 107. Optionally, the decrypting of the visible code(s) depends on data from the signals, for example location data, a visible code identifier, and/or the like.

Optionally, the direct communication transceiver 108 and/or the transceiver 107 transmit a message indicative of an identity of the wearer to trigger a beacon or another transmitting unit to transmit the above signals. This allows wirelessly receiving the wearer decryption code in response to the message and/or to receive information which is used for creating the decrypted content.

Figure 3:
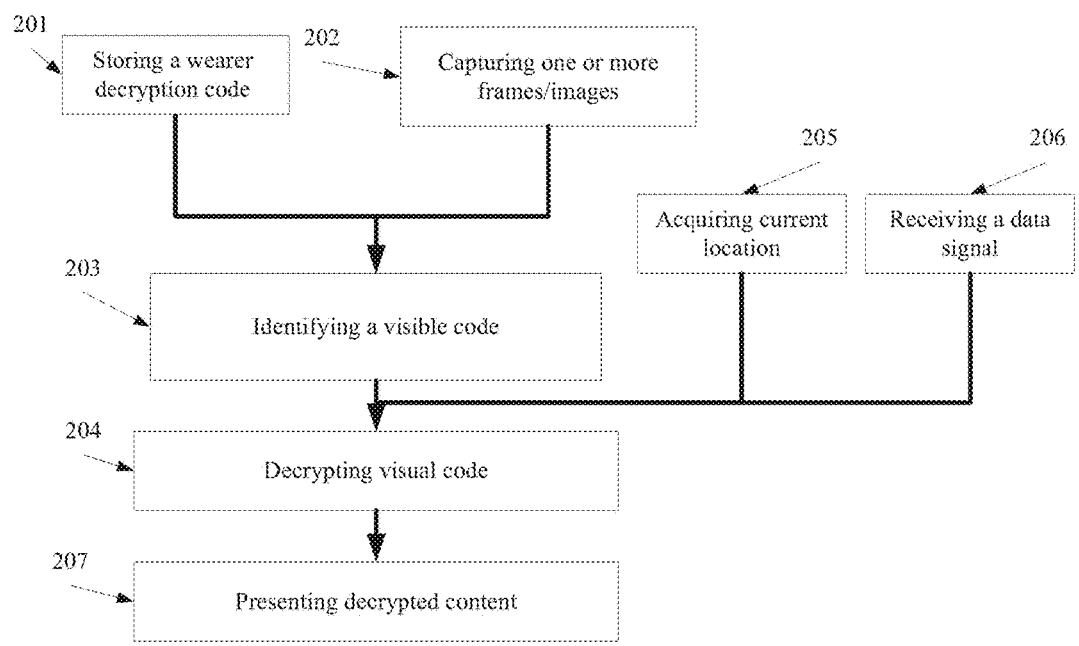
FIG. 3 is a flowchart of a method of generating an augmented reality view for a head-worn augmented display of a wearable computing device by decrypting content from visible code(s) and presenting the content on top of at least some of the visible code(s) and/or in association therewith, according to some embodiments of the present invention.

Reference is now also made to FIG. 3 which is a flowchart 200 of a method of generating an augmented reality view for a head-worn augmented display of a wearable computing device by decrypting content from visible code(s) and presenting the content on top of the visible code(s), according to some embodiments of the present invention. The method may be implemented using the wearable computing device depicted in FIGS. 1 and 2.

As shown at 201, a wearer decryption code is stored in a memory of a wearable mobile device having a head-worn augmented display that generates an augmented reality view for a wearer of the wearable mobile device, for example memory 102. The wearer decryption code is optionally a unique key for decrypting the visible code. The unique key may be stored as a file, a script, and/or a reference, such as a URL, optionally in an encrypted manner. The unique key may be installed offline in the wearable mobile device and/or stored in a memory which is disconnected from the main memory of the wearable mobile device, for brevity referred to herein external memory, for example a memory card that is connected to the wearable mobile device and/or a subscriber identification module (SIM) that is used by the wearable mobile device.

Optionally, the wearable mobile device is instructed to work in a no communication mode, for example a flight mode, when accessing the wearer decryption code. For example, a verification module allows access to the wearer decryption code, which may be installed in an external memory, only when the wearable mobile device is in a flight mode.

As shown at 202, the wearable mobile device captures one or more frames and/or image(s) imaging one or more visible code(s) using an image sensor of the wearable mobile device, for example 103. These frame(s) and/or image(s) are referred to herein, for brevity, as a video sequence. For example, the video sequence is captured by the image sensor that is mounted to capture some or all of the scene current viewed by the wearer of the wearable computing device 100.

As shown at 203, the video sequence is processed to identify the visible code. The visible code(s) may be a label, a code, plain text, a cipher text, an image, and/or a video. The visible code(s) may be printed or otherwise fixated to an object and/or presented on a display, for example a screen of a client terminal, a billboard, and/or a handheld device.

Figure 4A:
FIGS. 4A-4G are examples of optional visible codes, according to some embodiments of the present invention.
Figure 4B:
Figure 4C:
Figure 4D:
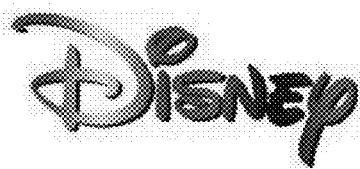
Figure 4E:
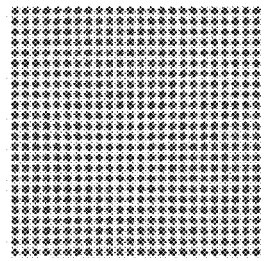
Figure 4F:
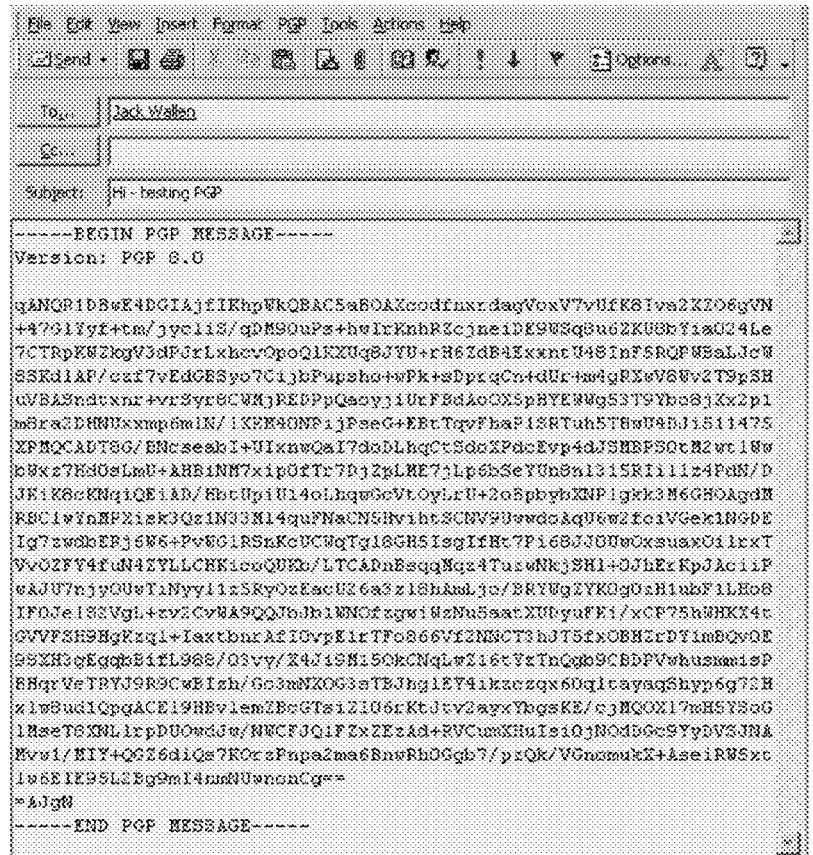
Figure 4G:

FIGS. 4A-4E depicts exemplary visible codes. FIG. 4A depicts an icon that may be transformed to decrypted content based on data which is acquired via the network based on the location of the wearable mobile device 100. FIG. 4B depicts a barcode that include encrypted content that is decrypted using the wearer decryption code. FIG. 4C depicts a QR code that include encrypted content that is decrypted using the wearer decryption code. FIG. 4D depicts a trademark that may be transformed to personalized decrypted content based on data which is acquired via the network based on the location of the wearable mobile device 100 and using the wearer decryption code. FIG. 4E depicts an encrypted content that may be transformed to personalized decrypted content by using the wearer decryption code to decrypt the visible code. FIG. 4F depicts an encrypted text in an email that may be transformed to personalized decrypted content by using the wearer decryption code to decrypt the visible code. FIG. 4G depicts an encrypted text in a webpage that may be transformed to personalized decrypted content by using the wearer decryption code to decrypt the visible code.

As shown at 204, the visible code is now decrypted using the wearer decryption code to create a decrypted content, for example by the processor of the wearable mobile device.

Optionally, the wearer decryption code is a key that transforms cipher text or plain text of the visible code to a decrypted content that is presented, in an augmented reality view only to him. The decrypted content may be transformed according to symmetric-key algorithm and/or asymmetric-key algorithm, see for example N. Ferguson; B. Schneier (2003). Practical Cryptography. Wiley. ISBN 0-471-22357-3, J. Katz; Y. Lindell (2007). Introduction to Modern Cryptography. CRC Press. ISBN 1-58488-551-3, A. J. Menezes; P. C. van Oorschot; S. A. Vanstone (1997). Handbook of Applied Cryptography. ISBN 0-8493-8523-7, IEEE 1363: Standard Specifications for Public-Key Cryptography, and Christ of Paar, Jan Pelzl, "Introduction to Public-Key Cryptography", Chapter 6 of "Understanding Cryptography, A Textbook for Students and Practitioners". (Companion web site contains online cryptography course that covers public-key cryptography), Springer, 2009, which are incorporated herein by reference in its entirety.

Optionally, the wearer decryption code is an image decryption key that transforms an image, for example according to a Chaotic Modulation algorithm, for example see Xiping He Qionghua Zhang, "Image Encryption Based on Chaotic-Modulation of Wavelet Coefficients", Congress on IEEE Image and Signal Processing (CISP'08), Sanya, Hainan, Vol. 1, pp. 622-626, 27 30-May 2008, Xin Zhang, Weibin Chen, "A New Chaotic Algorithm For Image Encryption", pp 889-892 IEEE ICALIP2008, Dong enxeng, Chen Zengqiang, Yuan zhuzhi, Chen zaiping, "A Chaotic Images Encryption Algorithm with The Key Mixing Proportion Factor", pp 169-174 Computer Society IEEE 200, Chong Fu, Zhen-chuan Zhang, Ying-yu Cao, "An Improved Image Encryption Algorithm Based on Chaotic Maps", Computer Society, IEEE 2007 and/or K. Sakthidasan, A New Chaotic Algorithm for Image Encryption and Decryption of Digital Color Images, International Journal of Information and Education Technology, Vol. 1, No. 2, June 2011, which are incorporated herein by reference in its entirety. The image may include a textual content, a graphical content and/or any other two dimensional content.

Optionally, the wearer decryption code is a location based wearer decryption code that changes based on geographical location information. In such embodiment, the wearable mobile device may acquire geographical location information, for example using a global positioning system (GPS) module or a cellular local positioning system, as shown at 205. This allows decrypting the same visible code differently at different locations, for example personalizing the experience of a user viewing the same visible code, such as a logo and/or a label, in different places in a different manner and/or using a certain visible code to present encrypted location related information that may be decrypted differently for different wearers. In another example, the visible code is placed on traffic signs and/or to be viewed from a road. In such embodiments, the visible code may be used to present driving and/or walking directions which are designated to the observer, for example guiding him to an event and/or a store. The visible code may be identical along the road while the presented directions are different and location dependent. In such a manner, the combination of the location and the visible code, when set to be decrypted using the wearer decryption code, creates decrypted content such as personalized directions to a store and/or information about a sale for observers which have been identified as interested to purchase a certain product or service. The wearer decryption code may be remotely updated with a respective decryption script or function before and/or when the observer is indentified in the respective location.

Optionally, as shown at 206, a data signal, for example a beacon signal as described above, is received. The data signal may be received before and/or during the capturing of the sequence. The reception of the data signal may trigger the above processing of the sequence and/or be triggered by the detection of the visible code. Optionally, the data signal includes a supporting code that maybe used, for example together with the wearer decryption code from the memory of the wearable computing device, to decrypt the visible code. Additionally or alternatively, the data signal includes encrypted content that is set to be decrypted by the wearer decryption code. In such embodiments, the visible code may be used as a placement for presenting the decrypted content, either with or without encrypted content. Alternatively data signal includes the wearer decryption code.

Optionally, as shown at 207, the decrypted content is presented on top of at least some of the visible code in the augmented reality view that is presented to the observer. Optionally, the location of the visible code is tracked, for instance by continuously analyzing the video sequence. This allows maintaining the decrypted content on top of at least some of the visible code in the augmented reality view, even if the observer changes her point of view. The tracking may be performed by different imaging processing methods.

For example, the visible code is an encoded text, for example an encoded message, and the wearer decryption code is used to transform it to a readable text that is presented on top of the visible code, allowing the observer to read the text using the wearable computing device 100 while peoples and/or cameras in his surrounding can view only the original text (cipher or plain) in the visible code. The user is presented with the augmented reality view wherein the decrypted content is presented on top of some or all of the cipher text or the plain text, for example a message that is designed to her and/or to people from a certain group, for example having a certain membership, access rights, classification and/or the like.

Optionally, the decrypted content is stored in the memory of the wearable computing device, for example for a predefined period of one minute, 30 minutes, one hour and/or any intermediate or longer periods. In such a manner, the decrypted content can be presented to the wearer even if he turns his head from the visible code. Optionally, the decrypted content is relocated to be presented at a corner and/or edge of the field of view of the wearer. Optionally, the decrypted content is stored until deleted. Optionally, the decrypted content is stored and immediately deleted to maintain a high security level. In such embodiments, any number of decrypted content items may be gathers and stored in the memory of the wearable computing device for future reference. Optionally, the wearer is required to gather a set and/or a sequence of decrypted content items for completing a multi stage process wherein he had to view a number of different pages and/or to visit in a number of different locations. Optionally, the wearer is required to gather a set and/or a sequence of decrypted content items for completing stocktaking and/or for ensuring that a predefined number and/or a group of people have been identified in a predefined period. In such embodiments, visible codes are used to mark or tag people and/or objects.

Figure 5B:
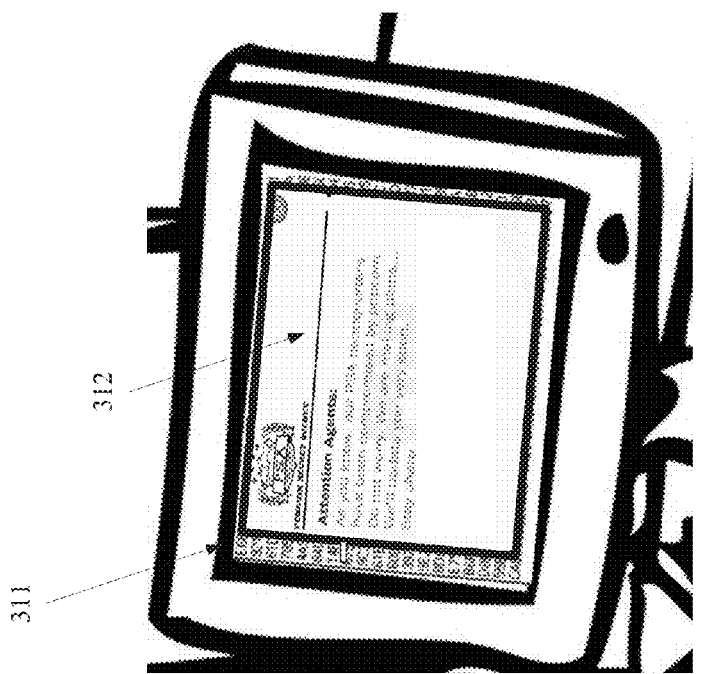
FIGS. 5A and 5B are, respectively, schematic illustrations of encrypted text presented on a screen to a wearer of the wearable computing device and a the wearer's field of view that includes the decrypted content presented as an overlay on top of at least some of the encrypted text 311, according to some embodiments of the present invention.
Figure 5A:
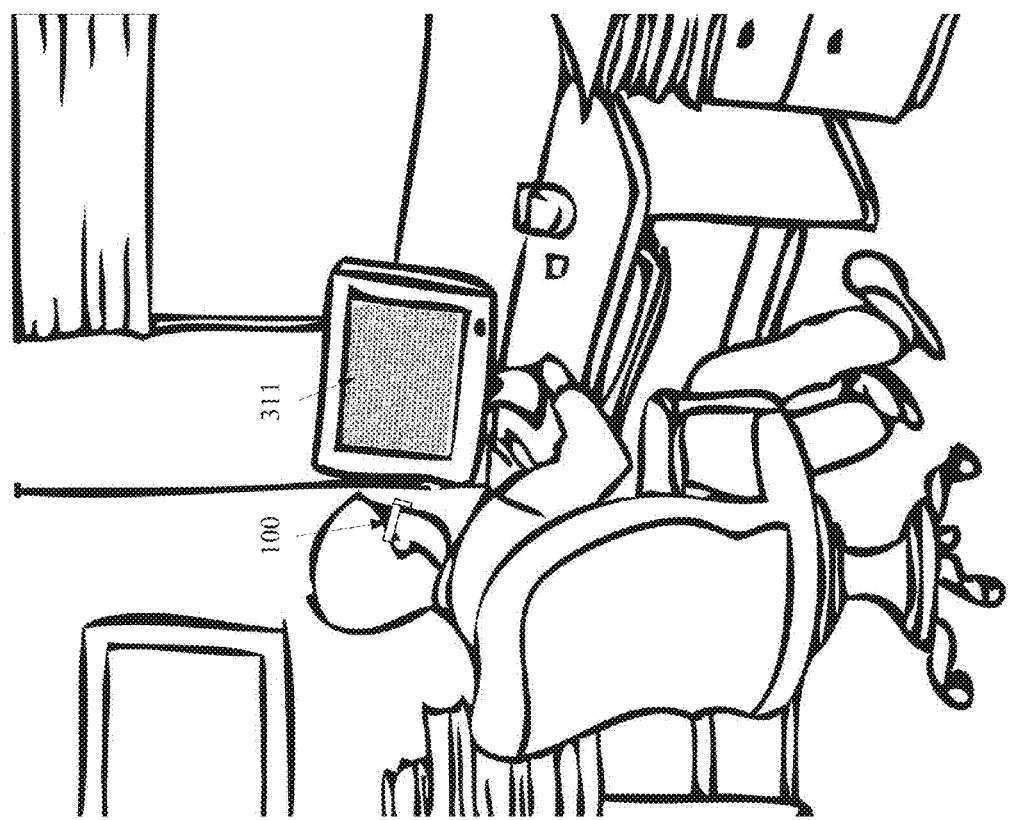

According to some embodiments of the present invention, the visible code is presented on a screen of a client terminal. For example, FIGS. 5A and 5B are, respectively, schematic illustrations of visible code, encrypted text 311, that is presented on a screen to a wearer 313 of the wearable computing device 100 and a the wearer's field of view that includes the decrypted content 312 presented as an overlay on top of the encrypted text 311. As exemplified in FIG. 5A, the encrypted text 311 can be viewed by users who are located in the surrounding of the wearer 313; however, these users are not presented with the decrypted content that is only presented to the wearer as part of the augmented reality view which is presented thereto. In such embodiments, the wearer decryption code may be updated with a wearer decryption code that is sent separately from the visible code, allowing the sender to add a layer of data protection to the sent content as the visible code is encoded and cannot be viewed without the wearer decryption code. For example, the visible code is presented in a webpage and the wearer decryption code is forwarded to the wearable computing device 100 via a short message service (SMS), a wireless application protocol (WAP) connection, offline installation, and/or the like. In another example, the visible code is sent in an email and the wearer decryption code is forwarded to the wearable computing device 100 via an SMS, a WAP connection and/or the like. Optionally, the wearable computing device 100 does not have a network connection, increasing the security of the wearer decryption code. Optionally, the wearer decryption code is sent by a peer to peer connection, optionally after a verification session, for instance by a local WPAN module or unit that is installed in proximity to the visible code, for instance a Bluetooth™ unit.

In the embodiments described above, the wearer decryption code is forwarded to the wearable computing device with the head-worn augmented display via a first network connection and the visible code is forwarded to the client terminal via a second network connection where the first and second network connections are different network connections.

Optionally, the visible code is printed on, digitally presented on and/or otherwise fixated to a billboard, a price tag, and/or a shop board. This allows an advertiser to present different personalized content to different observers at the same time, without having one observer know about the personalized content of the other. In such embodiments, different content is presented to different observers (i.e. customers), for example members of two consumer organizations are presented with different transaction terms (i.e. price, payment terms, and/or availability) by providing them with different wearer decryption codes, for example sending the different wearer decryption codes before and/or during the identification of the visible code by the respective wearable computing devices 100.

Additionally or alternatively, the wearer decryption code includes decryption code associated with a transaction benefit to be presented on top of a certain visible code. In such embodiments, the decrypted content is a text indicative of a benefit pertaining to transaction terms for a certain product. It should be noted that the visible code may be presented in a webpage and the decrypted content includes instructions of how to receive the benefit. In such embodiments, browsing users watching the same landing page may be presented with different benefits (in this example) and/or other content (in similar embodiments).

Figure 6B:
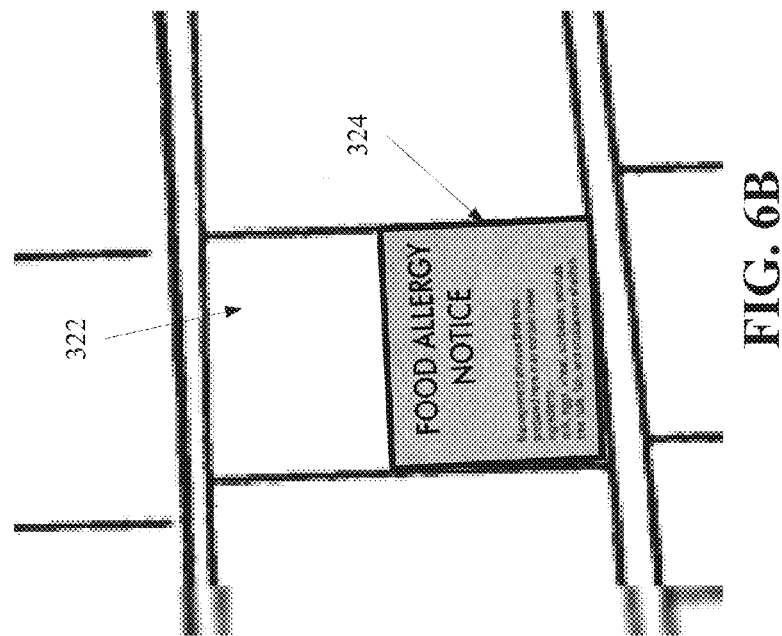
Figure 6B:
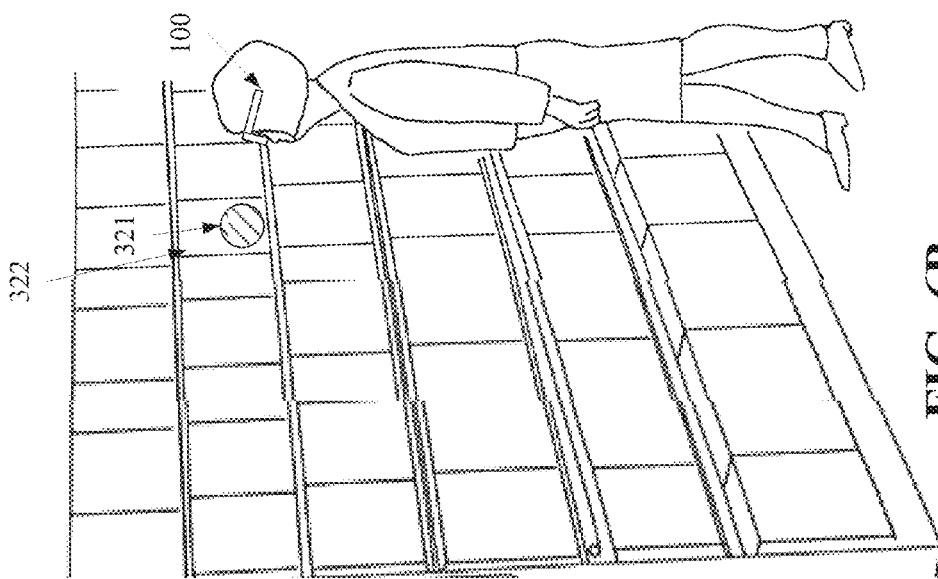

Additionally or alternatively, the wearer decryption code includes decryption code associated with a health notice pertaining to a product or service which is offered for sale and/or a certain location. For example FIGS. 6A and 6B are, respectively, schematic illustrations of a visible code 321 printed on a box of a food product 322 in a manner that is visible to a wearer 323 of the wearable computing device 100 and a the wearer's field of view that includes the decrypted content 324, an heath notice, presented as an overlay on top of the visible code 321, according to some embodiments of the present invention. In such a manner, different health notices which are adapted to different observers can be presented. For example, different notices may be presented to users at different age, gender, and/or the like. In one example, the visible code is printed on a medicine and/or a food product, allowing presenting notices which are adapted to the sensitivities, language, allergies, and/or pathologies of the observer.

Additionally or alternatively, a plurality of visible codes in a certain field of view of the wearer are imaged and analyzed, for example each separately as described above, to create a plurality of different messages and/or notices which are presented simultaneously in the augmented reality view for a wearer of the wearable mobile device. In such a manner the wearer can compare between two different products, for example according to related in information that is presented in the respective decrypted data, for example different health notices, promotional content, availability, and/or the like. Optionally, an automatic comparison between the respective decrypted data is presented to the wearer.

Additionally or alternatively, the wearer decryption code is associated with a current health profile of a wearer, for example as acquired from a health monitoring device, such as Jawbone UP™ and/or a software module, such as a dietary management module. In such embodiments, the visible code may be translated using the wearer decryption code to create a personalized message indicative of the advisability for the wearer to consume the related product (e.g. a food product on which the visible code is printed).

Additionally or alternatively, the wearer decryption code is associated with a current financial profile of a wearer, for example as acquired from a bank website and/or a financial management module. In such embodiments, the visible code may be or include a price tag translated using the wearer decryption code to create a personalized message indicative of the advisability for the wearer to purchase the related product in light of his credit and/or periodical budget.

Optionally, the wearable computing device determines the appearance of the decrypted data from the perspective of the wearer's field of view and adjusts the shape, size, and orientation of the decrypted data so that it corresponds to the perspective appearance of the visible code. The wearable computing device may also determine the distance to the visible code of the target device and adjust the apparent distance of the virtual control interface to match the distance to the defined area.

The wearable computing device may further recognize the wearer's motions with respect to the decrypted content located on top of the visible code, for example according to the location of the wearer's hand in relation to the visible code in the captured frame(s). For instance, the wearable computing device may recognize non-contact gestures towards the apparent position of the decrypted content as control instructions.

Optionally, the content to be presented from decrypting the visible code is user defined. For example a wearer may define which information to present and optionally with reference to which visible codes. In such a manner, the wearer indicates to receive certain information, for example from certain databases and//or with certain characteristics, in response to the detection of all or certain visible codes. For instance, the wearer may define presenting coupons of a certain product in response to a detection of a visible code representing the product, for example a label. In such embodiments, the wearer decryption code includes a function for instructing the acquiring of the coupons using a search engine and/or a related reference, such as a link to a website. Optionally, a user interface allows the user to indicate to which visible codes data should be presented, for example a tool for encircling an icon or a symbol in an image.

The visible code may be printed on wearable items, tickets, tags and/or any other object, either temporarily or permanently.

According to some embodiments of the present invention, a wearer decryption codes which are allocated to different wearable computing devices are managed by a central server. The wearer decryption codes may be updated to include new wearer decryption codes, cancelled and/or amended to assure security in case of wearable computing device lose and/or the like. The wearer decryption codes may be updated to decrypt new visible codes and/or to change the content which is associated therewith. The central server updates the central server be sending messages, during a wired and/or wireless sync process, for example similar to an updating of a Smartphone and/or the like.

According to some embodiments of the present invention, there are provided methods of operating one or more components, for example software components, of a wearable computing device, for example operating a locking module and such wearable computing devices. The wearable computing device is optionally as described above. The methods are optionally user authentication methods wherein the identity of the user is verified by the analysis of one or more biometric signatures of the wearer before operating the wearable computing device and/or using sensitive information stored thereon, such as the wearer decryption code. For example, before operating the wearable computing device and/or using and/or accessing sensitive information stored in the wearable computing device, one or more images and/or frames depicting one or more fingertips of the wearer are taken, for example using the image sensor 103, optionally while the user wears the wearable computing device. For example, an image of one or more palms of the wearer may be analyzed to extract fingertips of the wearer. In other embodiments, the wearer image one or more other body organs thereof, optionally in a predefined order that is set in advance, for example left elbow, right palm, left thumb, and left pinky and/or any other sequence of body organs and/or parts of body organs.

According to other embodiments of the present invention, before operating the wearable computing device and/or using and/or accessing sensitive information stored in the wearable computing device, one or more images and/or frames depicting one or more real world objects, optionally in a predefined order are captured. For example, a sequence of images depicting real world objects, such as a chain of keys, a cellular phone, and a watch has to be taken before a certain operation is unlocked. Optionally, the sequence combines one or more body organs and one or more real world objects.

In the above described embodiments, a sequence setting procedure wherein a reference sequence is stored and used as a reference sequence is managed by the wearable computing device. The reference sequence may later be used for creating a reference value(s) which are matched with images and/or frames which are captured to unlock an operation and/or software component and/or a hardware component of the wearable computing device. The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, a unit and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of decrypting an encrypted visible code, comprising:
   storing a wearer decryption code in a memory of a wearable mobile device having a head-worn augmented display presenting an augmented reality view for a wearer of said wearable mobile device;
   capturing using said wearable mobile device a video sequence including at least one frame imaging a visible code using an image sensor of said wearable mobile device;
   processing said video sequence to identify said visible code;
   decrypting said visible code using said wearer decryption code to create an decrypted content; and
   presenting said decrypted content on top of at least some of said visible code in said augmented reality view.

2. The method of claim 1, wherein said visible code is presented on a screen of a client terminal.

3. The method of claim 2, wherein said wearer decryption code is forwarded to said head-worn augmented display via a first network connection and said visible code is forwarded to said client terminal via a second network connection; wherein said first and second network connections are different network connections.

4. The method of claim 3, wherein said client terminal is a cellular device which is connected to said wearable mobile device and used for establishing said first and second network connections.

5. The method of claim 1, wherein said presenting comprises tracking the location of said visible code and relocating said decrypted content to remain on top of at least some of said visible code in said augmented reality view.

6. The method of claim 1, wherein said visible code comprises a barcode.

7. The method of claim 1, wherein said visible code includes a cipher text and said wearer decryption code is a key that determines a transformation of said cipher text.

8. The method of claim 1, wherein said visible code includes a plain text and said wearer decryption code is a key that determines a transformation of said plain text.

9. The method of claim 1, further comprising identifying a location of said head-worn augmented display and performing said decrypting using said wearer decryption code according to said location.

10. The method of claim 9, wherein said visible code is a text of a member of a group consisting of a traffic sign, a billboard, and a shop board.

11. The method of claim 9, wherein said wearer decryption code is associated with a transaction benefit and said visible code comprises a text indicative of a price of a product.

12. The method of claim 9, wherein said visible code comprises a text indicative of a health notice pertaining to a product offered for sale.

13. The method of claim 1, further comprising receiving a wirelessly transmitted message which contains said wearer decryption code.

14. The method of claim 13, wherein said processing is triggered by said wirelessly transmitted message.

15. The method of claim 1, further comprising transmitting a message indicative of an identity of said wearer and wirelessly receiving said wearer decryption code in response to said message.

16. The method of claim 1, wherein said wearer decryption code is generated according to an International Mobile Station Equipment Identity (IMEI) of a cellular device that is paired with said wearable mobile device.

17. The method of claim 1, wherein said decrypting includes using a biometric signature of said wearer to prepare said wearer decryption code.

18. A head-mounted display apparatus comprising:
- an image display device which generates an augmented reality view for an observer;
- a wearing device with which the image display device is worn on a head of said observer;
- a memory which stores a wearer decryption code;
- an image sensor which captures a video sequence including at least one frame imaging a visible code;
- a processor;
- an image processing module which processes said video sequence to identify said visible code;
- a decrypting module which decrypts said visible code using said wearer decryption code to create an decrypted content; and
- wherein said augmented reality view presents said decrypted content on top of at least some of said visible code.

19. A method of decrypting an encrypted visible code, comprising:
- forwarding, via a second network, a visible code to be presented on a screen of a client terminal;
- forwarding, via a first network, a wearer decryption code to a wearable mobile device having a head-worn augmented display presenting an augmented reality view which includes said screen for a wearer of said wearable mobile device;
- capturing a video sequence including at least one frame imaging said visible code when presented on said screen;
- processing said video sequence to identify said visible code;
- decrypting said visible code using said wearer decryption code to create an decrypted content; and
- presenting said decrypted content on top of at least some of said visible code in said augmented reality view.

* * * * *